3,597,451
Patented Aug. 3, 1971

3,597,451
PROCESS FOR THE PREPARATION OF (±) CIS-1,2-EPOXYPROPYL)-PHOSPHONIC ACID AND DERIVATIVES
Raymond A. Firestone, Fanwood, N.J., assignor to Merck & Co., Inc., Rahway, N.J.
No Drawing. Filed May 15, 1968, Ser. No. 729,423
Int. Cl. C07d 1/20, 1/22
U.S. Cl. 260—348                                      3 Claims

ABSTRACT OF THE DISCLOSURE

A process for the preparation of (±) (cis-1,2-epoxypropyl)-phosphonic acids, esters or salts thereof which comprises eliminating or extruding carbon dioxide and halogen from a (4,4-dihalo - 6 - methyl-1,3,5-trioxan-2-yl)-phosphonic acid or esters or salts thereof. The 1,2-epoxypropyl phosphonic acids or salts thereof are active anti-bacterial agents.

DESCRIPTION OF THE INVENTION

Preferred embodiments

This invention relates to a novel method for preparing salts or esters of (cis-1,2-epoxypropyl)-phosphonic acid or the free acid itself. More particularly, the invention relates to a novel process for preparing salts or esters of (±)-(cis - 1,2 - epoxypropyl)-phosphonic acid or the free acid itself by extruding or eliminating carbon dioxide and halogen from a (4,4-dihalo - 6 - methyl-1,3,5-trioxan - 2 - yl)-phosphonic acid, ester or salt thereof. The invention may be schematically represented as follows:

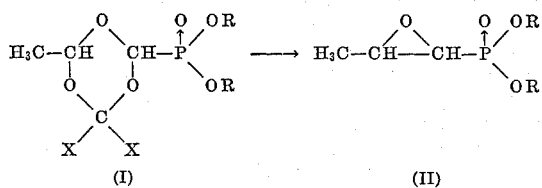

In the above Formulae I and II, X represents halogen, generally chloro, bromo or iodo, but preferably chloro; R can be the same or different and can represent hydrogen or a hydrocarbyl radical. Also included within this invention are processes for the preparation of organic or inorganic mono- or di-salts of the compounds of Formula II when at least one of R is hydrogen and the preparation of these organic or inorganic salts of the acid of Formula II represent a preferred embodiment of this invention.

When R in the above compounds is a hydrocarbyl radical, it may be an aliphatic, cycloaliphatic, araliphatic, aromatic or heterocyclic radical which may, if desired, be further substituted. Thus, for example, it may be aliphatic such as substituted or unsubstituted alkyl, alkenyl or alkynyl; representative examples of which are alkyl such as methyl, propyl, isopropyl, t-butyl, hexyl, octyl, decyl, dodecyl, haloethyl, acyloxyethyl, hydroxypropyl, aminoethyl or alkylaminomethyl; alkenyl such as allyl, methallyl, propenyl, hexenyl, octadienyl; alkynyl such as propargyl, ethinyl or chloroethinyl; cycloalkyl such as cyclohexyl, cyclohexenyl or cyclopropyl. When R is aliphatic, it preferably has from 1–6 carbon atoms.

Examples of R representing an araliphatic radical are those cases where it is aralkyl such as benzyl, phenethyl, phenylpropyl, p-halobenzyl and o-, m- or p-alkoxybenzyl.
R may also represent an aromatic radical, and preferably a mononuclear aromatic residue such as phenyl or substituted phenyl, e.g. p-chlorophenyl, o-nitrophenyl, o,p-dihalophenyl, cyanophenyl, methoxyphenyl and tolyl. When R is heterocyclic, it may be heteroaromatic such as pyridyl, furyl, thiazolyl or pyrazinyl, or alternatively it may represent a hydrogenated hetero ring, examples of which are tetrahydrofuryl and piperazinyl.

The process for making the salts of compounds of Formula II which are acidic, i.e. the free acids and the mono-esters is an especially preferred aspect of the invention because the salts are highly useful when the (±) (cis-1,2-epoxypropyl)-phosphonic acid compounds are employed as anti-bacterial agents since the free phosphonic acids are not as stable as could be desired, and the esters are not (except in particular instances) as active as the salts.

As stated previously, the free phosphonic acid compounds of Formulae I and II can be in the form of organic and inorganic salts. Examples of such salts are inorganic metallic salts such as the mono- and disodium salts, the mono- and dipotassium salts, calcium, magnesium, silver and iron salts. Organic salts that might be mentioned as representative include the amine salts such as α-phenylethylamine, ammonium, quinine, brucine, lysine, protamine, arginine, procaine, ethanolamine, morphine, benzylammonium, ethylinediamine, piperazine and glycine. If desired, the basic moiety of the salt may be a biologically active amine such as tetracycline or novobiocin.

The (cis-1,2-epoxypropyl)-phosphonic acid, preferably the (±) (cis-1,2-epoxypropyl)-phosphonic acid described herein, and the salts thereof, have significant anti-bacterial activity against a large number of pathogens. They are useful anti-microbial agents, which are active in inhibiting the growth of both Gram-positive and Gram-negative pathogenic bacteria. They are active against species of Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes.* Thus, (±) (cis-1,2-epoxypropyl)-phosphonic acid and salts thereof can be used as antiseptic agents to remove susceptible organisms from pharmaceutical, dental and medical equipment and other areas subject to infection by such organisms. Similarly, they can be used to separate certain microorganisms from mixtures of microorganisms. They are useful in the treatment of diseases caused by bacterial infections in man and animals and are particularly valuable in this respect, since they are active against many strains of pathogens resistant to previously available antibiotics. The salts are especially valuable, since they are effective when given orally, although they can be administered parenterally if desired.

The salts of (±) (cis-1,2-epoxypropyl)-phosphonic acid are useful as preservatives in industrial applications since they effectively inhibit undesirable bacterial growth in the white water used in paper mills and in paints, e.g. in polyvinyl acetate latex paint.

The designation cis used in describing the 1,2-epoxypropyl phosphonic acid compounds of Formula II means that each of the hydrogen atoms attached to carbon atoms 1 and 2 of the propylphosphonic acid are on the same side of the oxide ring.

According to the present invention, the elimination or extrusion of carbon dioxide and halogen from the appropriate starting material of Formula I is accomplished by reacting the (4,4 - dihalo-6-methyl-1,3,5-trioxan-2-yl) phosphonic acid, ester or salt thereof Formula I with a metallic coupling agent which can be any metal or combination of metals in Group Ia, IIa, Ib or IIb of the Periodic Table. Thus, for example, the metals can be magnesium, aluminum, lithium or sodium or a combination of metals such as a zinc/copper couple. It should be realized that if the more active metallic coupling agents described above are used with an ester or free acid starting material of Formula I, the corresponding metal salt may be formed.

Although the temperature of this elimination reaction is not critical, in order to eliminate carbon dioxide along with halogen, the reaction should be carried out at a temperature of from about room temperature to about 100° C., preferably at a temperature of from about 30° C.–80° C.

The reaction is also preferably carried out in an inert organic solvent, such as in a saturated hydrocarbon/ether mixture or in the ethers themselves. Such solvents can include diethyl ether, diethyl ether and glyme, diethyl ether and 1,2-dimethoxy ethane, tetrahydrofuran, tetrahydrofuran and glyme and tetrahydrofuran and 1,2-dimethoxy ethane. Any inert organic solvent can be used as long as the starting material of Formula I dissolves in said solvent but does not react with the solvent and the solvent meets the temperature requirements described above.

The reaction is generally carried out until no more carbon dioxide is evolved. The evolution of carbon dioxide is complete in about 10 minutes to 3 hours although the time will vary greatly depending on the temperature at which the elimination reaction is conducted. The metallic coupling agent is needed in the reaction in order to eliminate the dihalo group as a metal halide. The preferred zinc/copper metallic coupling agent can be prepared by known procedures, one such procedure being that shown in Shank/Scheok, J. Org. Chem., vol. 24, p. 1825 (1959).

The desired salts or esters of (±) (cis-1,2-epoxypropyl) phosphonic acid or the free acid itself prepared by the above reaction can be isolated from the reaction mixture by procedures known in the art but preferably if the immediate reaction product is an acid, it is generally isolated as a salt such as an alkali metal salt, for example, the sodium salt of the acid, by the addition of alcoholic sodium methoxide to the reaction mixture after any reaction by products have been filtered off. If an ester is prepared as the product of Formula II, it may be converted to the free acid or a salt thereof by hydrolysis or selective removal of the ester group. The hydrolysis may be with base or acid, be enzymatic or light catalyzed or via a trimethylsilyl derivative. The reductive removal of the ester group may be by hydrogenolysis or chemical as with sodium tertiary amine.

The reaction depicted by Formula II is stereo specific, hence, if one begins with the cis configuration of a compound of Formula I, a cis-1,2-epoxypropyl phosphonic acid, ester or salt will result. In like manner, if a cis/trans mixture of Formula I is the starting material, a cis/trans mixture of 1,2-epoxypropyl phosphonic acid will result. If a cis/trans mixture of isomers results, the cis-isomer can be separated therefrom by fractional crystallization or by vapor phase chromatography. Any trans-isomer can then be converted to the cis-isomer by subjecting a solution of the trans material to a source of short wave ultraviolet light such as that produced by a mercury vapor lamp. It is desirable to start with a cis-isomer of the compound of Formula I. Generally, the process for the preparation of the starting material of Formula I which is discussed below, yields the (±) cis-form although a (±) cis/trans mixture may sometimes be formed. If a cis/trans mixture of the starting material of Formula I is carried through to the final product, a separation of the cis-trans material can be made at this point although it is preferred to separate the cis/trans starting material and only use the cis-isomer.

Since the end products of Formula I are racemic mixtures they can be resolved into their optically active forms. The (—) (cis-1,2-epoxypropyl) phosphonic acid referred to herein rotates plane-polarized light in a counterclockwise direction (to the left as viewed by the observer) when the rotation of its disodium salt is measured in water (5% concentration) at 405 mµ.

The salts or esters of (4,4-dihalo-6-methyl-1,3,5-trioxan-2-yl) phosphonic acid, or the acid itself of Formula I can be prepared according to the following reaction sequence:

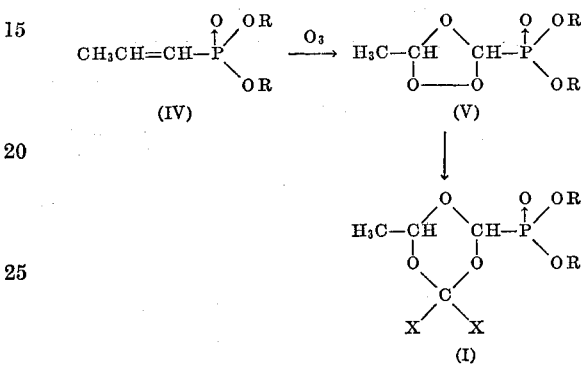

Thus the (4,4 - dihalo - 6 - methyl - 1,3,5 - trioxan-2-yl) phosphonic acid, ester or salt starting material of Formula I can be prepared by ozonizing 1-propenyl phosphonic acid or an ester or salt thereof to prepare an ozonide compound of Formula V and then reacting the ozonide compound with a halogenated hydrocarbon in order to insert a carbene radical across the —O—O-bond.

The ozonization reaction (Formulae IV to V) can be carried out by passing an oxygen stream containing ozone through a solution of 1-propenyl phosphonic acid dissolved in an inert organic solvent, preferably a saturated hydrocarbon solvent, such as pentane, n-hexane, cyclohexane or other organic solvents such as the Skelly solvents or tetrahydrofuran. The ozonization is continued until absorption of ozone has ceased and is carried out at very low temperatures, preferably below —70° C.

The propenyl phosphonic acid or its esters and salts thereof can be prepared as shown in Example 3.

The ozonide compound of Formula V, namely, the (5-methyl-1,2,4-trioxalan-3-yl) phosphonic acid, ester or salt thereof is then reacted with a halogenated hydrocarbon in the presence of a base such as an anhydrous alkali metal alkoxide or phenoxide bases in order to insert the carbene radical across the oxygen bond. The halogenated hydrocarbon reagent can be such reagents as chloroform, bromoform, bromodichloromethane or trichloroacetic esters with chloroform being the preferred reagent. The anhydrous alkali metal alkoxide or phenoxide base can be such bases as anhydrous sodium methoxide, potassium iso-propoxide, potassium t-butoxide, or sodium and potassium phenoxide with potassium t-butoxide being preferred.

The temperature at which the insertion reaction (Formulae V to I) can be carried out is generally at very low temperatures preferably below —60° C.

The (4,4 - dihalo - 6 - methyl - 1,3,5 - trioxan - 2 - yl) phosphonic acid, ester or salt thereof of Formula I can then be isolated by neutralizing excess base with an acid, cooling the reaction mixture, filtering off the precipitated salts and removing any solvent to yield the desired starting material.

The following are examples which illustrate this invention. They should be deemed illustrations of the invention and not limitation thereof.

EXAMPLE 1

Preparation of potassium (±) (cis-4,4-dichloro-6-methyl-1,3,5-trioxan-2-yl) phosphonate 0.1 mole of potassium propenyl phosphonate is added to 100 ml. of n-hexane in a flask. The solution is cooled to below −70° C. and an oxygen stream containing 4–5% of ozone is passed through the mixture until analysis of the effluent gas stream indicates that absorption of ozone has ceased. The cold (−70° C. or lower) n-hexane solution containing (5-methyl-1,2,4-trioxan-3-yl) phosphonic acid as a potassium salt is added under a nitrogen atmosphere to a flask containing 16.8 g. (0.15 mole) of absolute potassium t-butoxide and 100 ml. of n-hexane. 14.3 g. (0.12 mole) of dry chloroform is added with good agitation to the mixture over a one hour period, the reaction mixture being kept at −70° C. or below during the addition. The reaction mixture is then aged for 3 hours at −70° C. The cooled solution is filtered and the filtrate dried over molecular sieves to yield a mixture containing potassium (±) (cis - 4,4 - dichloro-6-methyl-1,3,5-trioxan-2-yl) phosphonic acid.

Following the procedure above, but using calcium, disodium, benzyl ammonium, methyl, diethyl or dibenzyl propenyl phosphonate in place of potassium propenyl phosphonate used above, there is produced an equivalent amount of a solution containing calcium, disodium, benzyl ammonium, methyl, diethyl or dibenzyl (±) (cis-4,4 - dichloro - 6 - methyl - 1,3,5 - trioxan - 2 - yl) phosphonate, respectively.

EXAMPLE 2

Preparation of potassium (±) (cis-1,2-epoxypropyl) phosphonate

The mixture obtained in Example 1 which contains potassium (±) (cis - 4,4 - dichloro - 6 - methyl - 1,3,5-trioxan-2-yl) phosphonate is diluted with an equal volume of dry ethyl ether and is refluxed with 0.1 mole of an active zinc/copper couple until the evolution of carbon dioxide ceases. The reaction mixture is then cooled to 5° C. and 10 ml. of glacial acid is added to the cooled reaction mixture which is then stirred for 15 minutes and filtered. The filtrate is washed with water and dried to yield potassium (±) (cis-1,2-epoxypropyl) phosphonate.

Following the procedure above but using an equivalent amount of calcium, disodium, benzyl ammonium, methyl, diethyl or dibenzyl (±) (cis - 4,4 - dichloro - 6 - methyl-1,3,5-trioxan-2-yl) phosphonate in place of potassium (±) (cis - 4,4 - dichloro - 6 - methyl - 1,3,5 - trioxan-2-yl) phosphonate used above, there is obtained an equivalent amount of calcium, disodium, benzyl ammonium, methyl, diethyl or dibenzyl (±) (cis-1,2-epoxypropyl) phosphonate.

EXAMPLE 3

Preparation of cis propenyl phosphonic acid (a) Phosphorous trichloride (68.7 grams, 0.5 mole) and 750 ml. of anhydrous benzene are placed in a 2-liter, 3-necked flask equipped with mechanical stirrer, thermometer, dropping funnel and a drying tube. The solution is cooled to 5° C. and triethylamine (50.6 grams, 0.5 mole) is added at 5° C.–10° C. during 20 minutes. The benzene solution is then stirred for 20 minutes. A solution of triethylamine (50.6 grams, 0.5 mole) and t-butanol (37.06 grams, 0.5 mole) is added with stirring during 20 minutes at 5° C.–10° C., and the mixture is stirred for 20 minutes. A second portion of t-butanol (37.06 grams, 0.5 mole) is then added at 5° C.–10° C. over a 20 minute period, and the reaction containing di-t-butylphosphorochloridite mixture is stirred for 90 minutes at 5° C.–10° C.

(b) Triethylamine (50.6 grams, 0.5 mole) and propargyl alcohol (28.03 grams, 0.5 mole) are dissolved in 40 ml. of anhydrous benzene, and the solution is added to the reaction mixture containing di-t-butyl phosphorochloridite with stirring during 25 minutes, maintaining the reaction temperature between 5° C.–10° C. by external cooling. The resulting mixture containing di-t-butyl-2-propynyl-phosphite is stirred at 5° C.–10° C. for one hour.

(c) The reaction mixture containing di-t-butyl-2-propynylphosphite is then heated to reflux, and the refluxing is continued for one hour. The solution is then cooled to room temperature with a water bath, and 185 ml. of water is added in portions. The triethylamine hydrochloride dissolves in the aqueous layer, and the organic layer is separated from the aqueous layer. The benzene solution is heated at barometric pressure, and the water is removed by azeotropic distillation. The residual benzene solution contains di-t-butyl-propadienylphosphonate.

Where desired, the crude ester can be obtained by removing the solvent and distilling the ester under high vacuum; the pure ester is characterized by IR and NMR spectra.

(d) The dried benzene solution of di-t-butyl-propadienylphosphonate is hydrogenated at 20° C.–25° C. with 5% Pd/C catalyst (5.0 grams) until hydrogen absorption ceases. The catalyst is removed by filtration and is washed with 2× 50 ml. of benzene. Upon removal of the solvent in vacuo, di-t-butyl-cis-propenylphosphonate is obtained and is characterized by NMR and IR spectra. The crude ester can be purified by high vacuum distillation.

Di-t-butyl-cis-propenylphosphonate (1.0 mole) and cis-propenylphosphonic acid (0.05 mole) are dissolved in 235 ml. of benzene, and the solution is heated at reflux until the calculated amount of isobutene is formed. A gas metering device is employed to detect the isobutene. The reaction mixture is then cooled to room temperature, the solvent is removed in vacuo and cis-propenylphosphonic acid is obtained as the residue.

Salts of cis-propenylphosphonic acid are made by treating the free acid in ethanol with a base. The metal salts are obtained by employing a metal oxide or hydroxide as the base, and amine salts by employing the appropriate amine. In order to obtain a mono-salt, the pH is adjusted with the base to 4.8 for metal salts and 4.2 for amine salts; for di-salts the pH is adjusted to 8.8 for metal salts and 8.2 for amine salts. In order to recover the salt, the ethanol is removed by evaporation in vacuo. Thus, for example, 2 g. of cis-propenylphosphonic acid in 50 ml. of ethanol is adjusted to a pH of 4.8 with aqueous sodium hydroxide. The mixture is concentrated to dryness in vacuo to afford the mono-sodium cis-propenylphosphonate. When aqueous sodium hydroxide is added to the above solution to a pH of 8.8, and the mixture concentrated to dryness, the di-sodium cis-propenylphosphonate is obtained. The mono- and di-benzylamine salts are obtained in the same fashion by adding benzyl amine to the ethanolic solution of cis-propenylphosphonic acid to a pH of 4.2 or 8.2 Any of the other salts discussed hereinabove are obtained in the same manner using the appropriate base.

What is claimed is:

1. A process for the preparation of a (±) cis compound of the formula

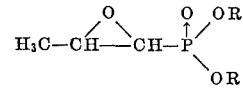

wherein R is the same or different and represents hydrogen or a hydrocarbyl radical and amine or metal salts thereof when at least one of R is hydrogen, which comprises reacting a compound of the formula

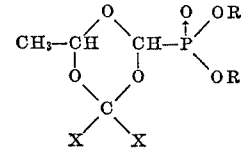

wherein R is as previously described and X is halogen, with at least one metal of Group Ia, IIa, Ib or IIb of the Periodic Table at a temperature from room temperature to 100° C. in an inert organic solvent until no more carbon dioxide is evolved.

2. The process of claim 1 wherein the metal is a zinc/copper couple.

3. The process of claim 1 wherein a metal salt of (±) (cis - 4,4 - dichloro - 6 - methyl-1,3,5,-trioxan-2-yl)phosphonate is reacted.

No references cited.

NORMA S. MILESTONE, Primary Examiner

U.S. Cl. X.R.

260—340.7, 956, 999